INVENTOR.
FRANK DONALD BURNS.

Patented Mar. 4, 1947

2,416,980

UNITED STATES PATENT OFFICE 2,416,980

STABILIZER FOR PROCESS CONTROLLERS

Frank Donald Burns, Long Beach, Ind., assignor to The Hays Corporation, Michigan City, Ind., a corporation of Indiana Application October 1, 1942, Serial No. 460,392

20 Claims. (Cl. 236—26)

This invention relates to a stabilizer for controllers or regulators, and more particularly to the provision of a stabilizer with a controller or regulator for a process having storage or capacity lag and including an element having no reset reference point.

In some instances the controller or regulator for a process may be actuated by a drive unit which does not have a reference point to facilitate setting or resetting of the controller. In such instances it becomes quite difficult to properly stabilize the controller for efficient operation of the controlled process, and to limit the impulses transmitted to the controller to those which are measured and proportioned to deviations in the controlled process which actuate the metering device associated with the controller.

An example of a process presenting this problem is a combustion system having a draft fan driven by a constant speed motor through the medium of a hydraulic coupling of the type whose efficiency varies in proportion to the amount of liquid contained therein. In such a process, the speed of the fan is proportional to the quantity of liquid contained in the coupling. The character of the coupling is such that, for practical consideration, it may be regarded as lacking any reference point to permit its resetting.

It is the primary object of this invention to provide means for stabilizing a controller or regulator whose driving unit has no reference point for facilitating resetting of the controller.

A further object is to provide simple means for accurately and quickly setting a controller or regulator actuated by a driving unit which lacks a reference point to guide resetting thereof.

A further object is to provide means for stabilizing, by measured impulses proportioned to process deviations, a controller associated with a process element connected by means of a hydraulic coupling with a driving member operating at constant speed.

A further object is to provide a device of this character wherein a pneumatic metering device responsive to variation in a process, controls a pair of reversible motors actuating a liquid pump and an air pump, respectively, said liquid pump being connected with a hydraulic coupling interposed in a driving unit of a controller element, and said air pump being connected with said metering device by a pneumatic system having a bleed valve.

A further object is to provide simple means for applying to a process controller or regulator associated with a driving unit having no reset or reference point, a measured correcting impulse proportional to a process deviation.

Other objects will be apparent from the description and appended claims.

Figure 1:
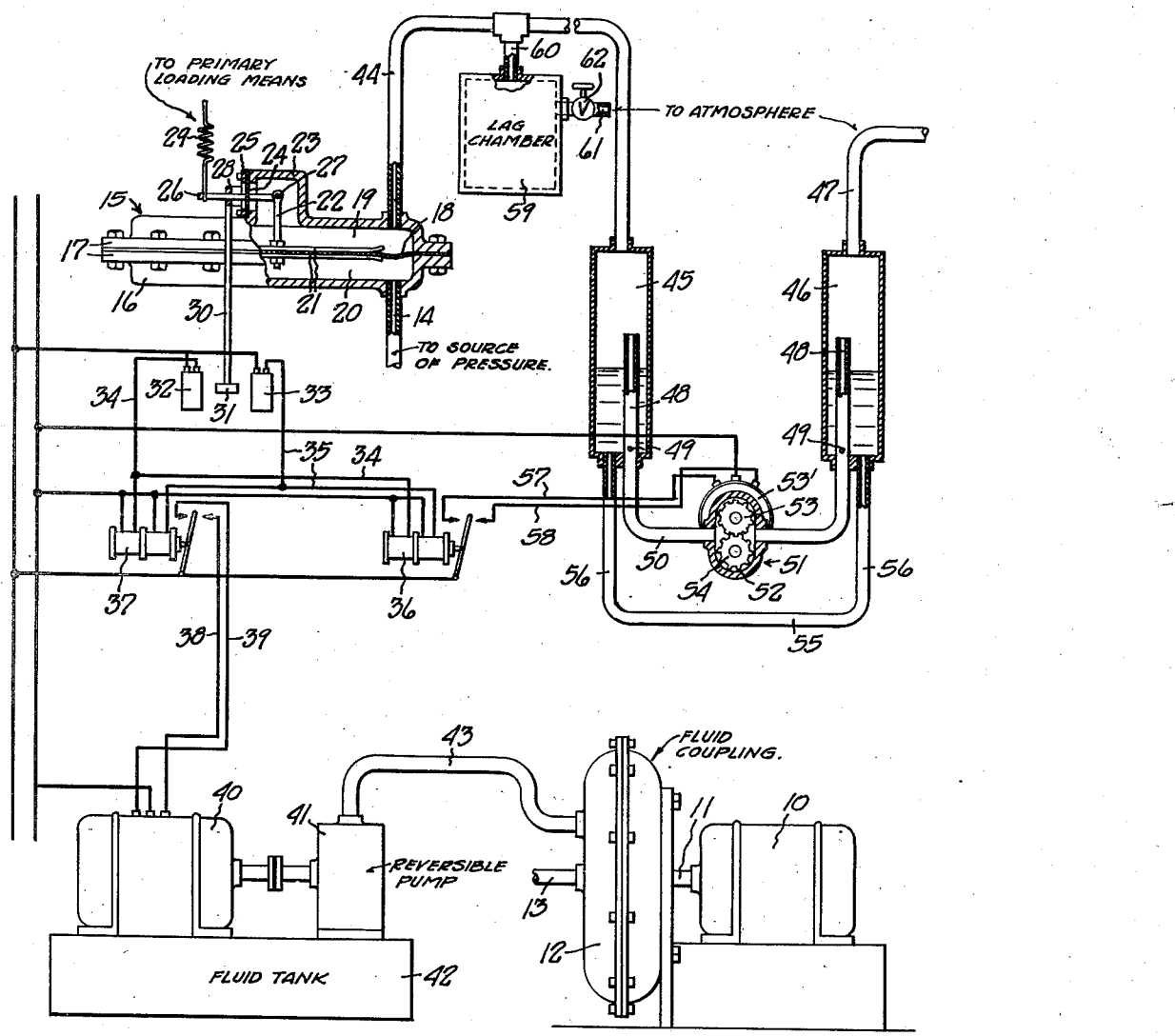
Fig. 1 is a diagrammatic view illustrating the application of my stabilizer to a process for response to pressure variations in the process.

Referring to the drawings, and particularly to Fig. 1, which illustrates the application of the device for response to predetermined process variations, including a variation in pressure at a selected point, the numeral 10 designates a constant speed motor. The shaft 11 of motor 10 is connected with the impeller of a conventional fluid coupling 12. The driven or output shaft 13 of coupling 12 is adapted to be connected with an element (not shown) of the process to be controlled, such as a fan. Coupling 12 is preferably of the type whose efficiency varies according to the amount of fluid contained therein. Consequently, variations in the speed of the fan and of the pressure produced thereby may be provided by varying the amount of fluid in the coupling, despite the fact that the prime mover 10 operates at constant speed. However, it will be observed that, for all practical purposes, it may be considered that such a coupling lacks a reference point for resetting purposes, i. e., for determining the proper amount of fluid to be added or withdrawn to condition the coupling to increase or decrease fan speed according to a given process deviation.

A conduit 14 is connected to the process in a manner to be subject to the pressure in the process produced by the fan, and is connected to a metering unit 15.

As here illustrated, metering unit 15 comprises a two part housing 16 having a central parting plane and marginal clamping flanges 17. A suitable diaphragm 18 is clamped at its margin between flanges 17 and serves to divide housing 16 into complementary chambers 19 and 20. Conduit 14 communicates with chamber 20. A pair of rigid plates 21, of a size smaller than the interior dimensions of the housing 16, are secured to opposite sides of the diaphragm in clamping relation thereto. A rod 22 projects perpendicularly from the center of plates 21 and into a central chambered projection 23 formed in one part of housing 16. One side wall of projection 23 has an opening therein spanned by a diaphragm 24 held in place by a marginal clamping ring 25. A lever 26 is pivoted at 27 to the end of rod 22 and extends substantially perpendicularly thereto and through diaphragm 24. A yoke 28 is pivoted to housing projection 23, and lever 26 is connected therewith intermediate its ends. The outer end of lever 26 is connected with a tensioned loading spring 29 which is connected with an element, such as a master steam meter, associated with the process under control. It will be observed that the tension of spring 29 is exerted upon diaphragm 18 in opposition to the pressure applied to said diaphragm through conduit 14.

Yoke 28 carries a weighbeam 30 depending therefrom. Weighbeam 30 mounts a magnet 31 at its lower end. A pair of magnetically operated mercury switches or contacts 32 and 33 are positioned on opposite sides of magnet 31 in the plane of pivotal movement of weighbeam 30, and in equi-spaced relation to the magnet when the latter is in neutral or balanced position. Leads 34 and 35 of relay circuits extend from switches 32 and 33, respectively, to the coils of a reversing pilot pump relay 36 and of a reversing pump relay 37. These relays are preferably provided with means urging them to neutral position.

Leads 38 and 39 extend from pump relay 37 to a reversible electric motor 40. Motor 40 has a driving connection with a reversible fluid pump 41, such as an oil pump. Pump 41 is connected with an oil tank or reservoir 42. A conduit 43 connects pump 41 with fluid coupling 12.

A conduit 44 is connected with chamber 19 of metering unit 15 and leads to the top of a chamber 45. A second chamber 46, similar to chamber 45, is juxtaposed thereto at the same level. A conduit 47 leads from the top of chamber 46 and is open to atmosphere. A U-shaped conduit has its opposite vertical leg portions 48 extending through the bottoms of chambers 45 and 46 and terminating within said chambers well above the bottoms thereof. The leg portions 48 are open at their upper ends, and each has a small opening 49 formed therein at a point just above the bottom of the associated chamber. The horizontal intermediate portion 50 of the U-shaped conduit has a pump 51 interposed therein. Pump 51 preferably comprises a housing 52 within which gears 53 and 54 fit with a small rotative clearance. The connections of conduit portion 50 with the pump housing are preferably substantially aligned with the point at which gears 53 and 54 mesh, and conduit portion 50 extends perpendicularly to the axes of said gears. One of the gears 53, 54 is driven by a reversible electric motor 53'. A second U-shaped conduit 55 has its opposite vertical leg portions 56 connected with chambers 45 and 46 and extending through the bottoms of said chambers. The ends of conduit leg portions 56 are open and terminate adjacent the inner surfaces of the bottoms of said chambers. The intermediate portion of U-shaped conduit 55 is positioned below the level of the bottoms of chambers 45 and 46. Chambers 45 and 46 are filled with a liquid, such as oil, to a level below the upper ends of the conduit legs 48. Leads 57 and 58 extend from pilot relay 36 to the drive motor 53' for the gear pump 51.

A lag chamber 59 is connected with conduit 44 by a branch conduit 60. An open ended bleed conduit 61 communicates with the lag chamber and has a bleed valve 62 interposed therein.

The operation of the device is as follows: The diaphragm 18 of metering unit 15 is normally balanced by the opposed forces applied thereto by means of conduit 14 and spring 29. Upon any deviation in the controlled process, such as a variation in steam pressure which acts to vary the tension of spring 29, or a variation of pressure within conduit 14, the diaphragm becomes unbalanced. Thus a drop in steam pressure measured by a master steam meter and calling for an increase in fan speed, may increase the tension of spring 29. This increased spring tension acting on lever 26 tilts said lever and yoke 28 in a manner to swing weighbeam 30 to the left in increase direction. This causes the magnet 31 to close increase switch 32, thereby closing a circuit through the increase leads 34 to relays 36 and 37. Relay 37 closes a circuit through lead 39 to reversible motor 40 to cause the same to operate reversible pump 41 in a direction to pump oil from tank 42 through conduit 43 to fluid coupling 12. The added fluid so supplied to coupling 12 increases the operating efficiency of said coupling, and thus increases the speed of the process fan to increase the pressure in the process for the purpose of generating additional steam. Also, the pressure increase is transmitted by conduit 14 to diaphragm 18 for the purpose of rebalancing the diaphragm.

Simultaneously with the above operation acting directly upon the process, relay 36 closes a circuit through lead 57 to the reversible drive motor 53' of pump 51 to cause said pump to operate to create a suction in conduit 44. Thus, as gear 53 is caused to rotate counterclockwise, drops of oil from chamber 45 pass through opening 49 into the left leg 48 of U-shaped conduit 50 and trap air therebetween which is forced therewith through said conduit to chamber 46 for exhaust to atmosphere at 47. Hence it will be observed that a suction effect is created within chamber 19 of the metering unit and within lag chamber 59 which supplements the action upon diaphragm 18 of pressure from conduit 14, i. e., fan discharge pressure, and quickly restores the diaphragm 18 of the metering unit to balance. Assuming that storage lag predominates in the device, that is a time lag in the process to be controlled occurring between the control element therefor and the point of the process at which the fluid connection to the metering unit is tapped, for example, lag resulting from the inertia of the fan, it is apparent that pump 51 will serve to restore the diaphragm 18 of the metering unit to balance before the pressure increase in the fan discharge is effective upon the said diaphragm. Hence, the fan discharge pressure will continue to increase after the diaphragm has been restored to balance, and the bleed valve 62 is set to admit air into the lag chamber 59 at a rate to restore said chamber and metering unit chamber 19 to atmospheric pressure in time with the increase in pressure in the fan discharge and in metering unit chamber 20.

The regulator may be set to give either "dead beat" regulation, or a more quickly responsive "hunting" regulation of the type wherein successive pulsations are of diminishing amplitude.

Figure 2:
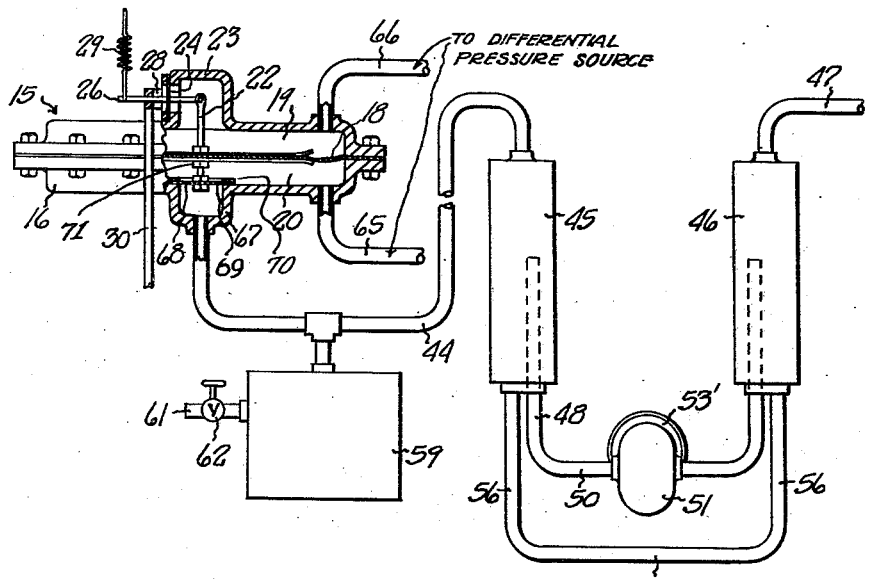
Fig. 2 is a fragmentary diagrammatic view illustrating the manner in which my device is associated with a process for response to variations in differential pressure in the process.

It will be understood that upon an opposite unbalancing process deviation to that above described, for example, upon an increase in steam pressure in the process above a predetermined range, the diaphragm will be unbalanced in an upward direction incident to a reduction in the tension of spring 29 exerted by the master steam meter. Hence weighbeam 30 and magnet 31 are swung to the right to close switch 33. Switch 33 closes a circuit through leads 35 to relays 36 and 37. Relay 37 closes a circuit through lead 38 to motor 40 to cause said motor to operate in a direction driving pump 41 to pump oil from fluid coupling 12 through conduit 43 to tank 42. This reduces the operating efficiency of coupling 12 and the speed of its shaft 13 to reduce the speed of the pressure generating process element. Simultaneously, relay 36 closes a circuit through lead 58 to the drive motor 53' for pump 51 to cause said pump to operate with gear 53 rotating in clockwise direction. The pump thus serves to pump air into chamber 45 and through conduit 44 to lag chamber 59 and metering unit chamber 19, thereby increasing the pressure in said parts until the diaphragm 18 is rebalanced. This pressure increase in chamber 19 is bled off by valve 62 in timed relation to the drop in pressure in metering unit chamber 20 occasioned by the reduced speed operation of the fan discharge pressure having a driving connection with coupling 12.

Where the process is to be controlled in partial response to variations of differential pressure therein at a certain point, i. e., in response to variations in flow at said point due to a change in the speed of a fan, an arrangement as illustrated in Fig. 2 may be employed. The parts illustrated in Fig. 2 bear the same reference numerals as the Fig. 1 embodiment. In Fig. 2 a high pressure conduit 65 is connected in communication with chamber 20 of metering unit 15, and a low pressure conduit 66 is connected in communication with chamber 19 of metering unit 15. The lower part of housing 16 is provided with a central off-set portion 67 defining a chamber 68. Conduit 44, leading from chamber 45 of the air pump, is connected in communication with housing chamber 68. Chamber 68 is closed interiorly by a diaphragm 69 spanning the mouth of projection 67, and is he'd in place by a clamp ring 70. Portion 71 of rod 22 extends to and is connected with diaphragm 69. A lag chamber 59 communicates with conduit 44.

The operation of the device is the same as that described above. Thus any unbalance of the forces acting upon diaphragm 18 calling for an increase in flow, i. e., differential pressure, serves to swing the weighbeam to close the relay circuits. Pump 51 is started simultaneously with the control element, such as motor 40 (a fan), associated with the fluid coupling. Pump 51 serves to pump air into and create a pressure in chamber 45, lag chamber 59 and conduit 44. When this pressure has rebalanced the diaphragm 18 and returned weighbeam 30 to neutral position, thus stopping pump 51 and the pump connected with the fluid coupling, bleed valve 62 permits the pressure to be bled off in time with the increase in flow acting upon the metering unit through conduits 65 and 66. When the diaphragm is unbalanced in decrease direction, the operation is reversed. That is, pump 51 operates to create a sub-atmospheric pressure in chamber 68, lag chamber 57 and conduit 44. This sub-atmospheric pressure is dissipated by the intake of air through bleed valve 62 in time with the reduction in differential pressure from conduits 65 and 66, after the diaphragm 18 has been restored to balance by the sub-atmospheric pressure generated by pump 51 as aforesaid.

Figure 3:
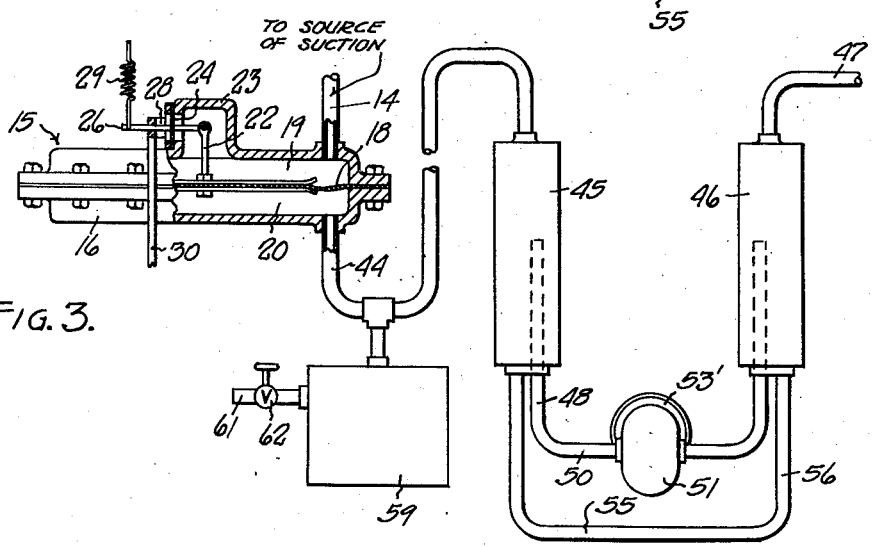
Fig. 3 is a fragmentary diagrammatic view illustrating the manner in which my device is associated with a process for response to variations of suction in the process.

Fig. 3 illustrates the arrangement of the parts where the stabilizer is to be controlled in partial response to variations in draft or suction in a process. This arrangement differs from the arrangement in Fig. 1 primarily with respect to the reversal of the connections of conduits 14 and 44 with the metering unit. Thus conduit 14 is connected with chamber 19 and conduit 44 is connected with chamber 20, in this embodiment. Also, attention is directed to the fact that a drop in steam pressure in the process, calling for draft increase, as generated by fan suction, results in actuation of weighbeam 30 to control the associated relays to apply a positive pressure generated by pump 51 to chamber 20 and lag chamber 59; while an increase in steam pressure in the process, calling for draft reduction, results in actuation of weighbeam 30 to control the associated relays to apply a sub-atmospheric pressure generated by pump 51 to chamber 20 and lag chamber 59. The timed bleeding of these respective conditions generated by pump 51, in time with the variation within the process as applied to the diaphragm through conduit 44, is accomplished by the bleed valve 62 associated with lag chamber 59 in the same manner as outlined above.

I claim:

1. A process regulator comprising a process control mechanism, a constant speed power member actuating said mechanism, a fluid coupling interposed between said mechanism and power member, a fluid tank connected with said coupling, a reversible pump interposed between said tank and coupling, a reversible power member actuating said pump, a metering device connected with said process and responsive to operation of said control mechanism, said metering device including a normally balanced diaphragm, a reversible air pump, means connecting said air pump and metering device, a reversible power member actuating said air pump, means controlled by said metering device upon unbalance of said diaphragm for simultaneously energizing the power members associated with said pumps to generate a pneumatic rebalancing condition at said air pump and to regulate the amount of fluid in said coupling, and an adjustable bleed valve interposed in said connecting means to bleed off said pneumatic rebalancing condition in time with the response of said metering device to the effect of the regulation of said fluid coupling.

2. A process regulator comprising a process control mechanism, a constant speed power member actuating said mechanism, a fluid coupling interposed between said mechanism and power member, a fluid tank connected with said coupling, a reversible pump interposed between said tank and coupling, a reversible power member actuating said pump, a metering device connected with said process for response to the operation of said mechanism, said metering device including a normally balanced diaphragm, a reversible air pump, means connecting said air pump and metering device, a reversible power member actuating said air pump, means controlled by said metering device for simultaneously energizing the power members associated with said pumps upon unbalance of said diaphragm and deenergizing the same upon rebalancing of said diaphragm, said connecting means including a conduit for transmitting a rebalancing impulse generated by said air pump to said metering device upon unbalance of said diaphragm, a lag chamber communicating with said conduit and having an atmospheric opening, and an adjustable bleed valve controlling said opening.

3. A process regulator comprising a process control mechanism, a constant speed motor thereof, a fluid coupling interconnecting said mechanism and motor, a fluid reservoir connected with said coupling, a reversible pump associated with said reservoir, a reversible power member for actuating said pump, a metering device connected with said process for response to the operation of said mechanism, said metering device including a normally balanced diaphragm, an air pump, a reversible power member for actuating said air pump, means connecting said metering device and said air pump for transmission to said metering device of diaphragm-balancing impulses from said air pump, an electrical switch controlled by said metering device, reversible relays controlled by said switch for controlling said power members for simultaneous and proportional operation of said pumps, and bleed means in said connecting means for dissipating said diaphragm-balancing impulses at said metering device in time with the response of said metering device to variations in the operation of said control mechanism by said first pump.

4. A process regulator comprising a process control mechanism, a constant speed motor therefor, a fluid coupling interconnecting said mechanism and motor, means for selectively adding to and withdrawing liquid from said coupling, a metering device connected to said process for at least partial response to operation of said mechanism and including a normally balanced diaphragm, pneumatic means for selectively adding to and withdrawing air from said metering device, means controlled by said diaphragm upon unbalance thereof for simultaneously and proportionally actuating both selective means in corrective relation to rebalance said diaphragm, and adjustable bleed means associated with said last named selective means and open to atmosphere to dissipate rebalancing impulses from said pneumatic means in time with the time required for response of said metering device to operation of said control mechanism.

5. A process regulator comprising a process control mechanism, a constant speed drive motor therefor, a fluid coupling interconnecting said motor and mechanism, a normally balanced metering device responsive to a process variation, means controlled by said metering device upon unbalance thereof for regulating the operating efficiency of said coupling to rebalance said metering device, and force generating means controlled by said metering device and actuated simultaneously and proportionally with said coupling regulating means for applying a force counterbalancing said process variation to said metering device for the time required for rebalancing of said metering device responsive to adjustment of said control mechanism.

6. A process regulator comprising a process control mechanism, a constant speed drive motor therefor, a fluid coupling interconnecting said motor and mechanism, a metering device responsive to a process variation, means for selectively regulating the operating efficiency of said coupling to balance said metering device, means for generating and temporarily applying to said metering device during the time required for response thereof to adjustment of said control mechanism a force counterbalancing said process variation, a reversing switch controlled by said metering device, and reversing relay means controlled by said switch and simultaneously controlling said coupling regulating means and said metering device counterbalancing means.

7. A process regulator comprising a process control mechanism including a fluid coupling, liquid flow means regulating said coupling, a normally balanced metering device responsive to a process variation, said metering device operating on unbalance thereof to selectively adjust said liquid flow means to overcome said unbalance, force generating means controlled by said metering device and operating in proportioned and simultaneous relation to said flow means for applying to said metering device a rebalancing force, and means for dissipating said rebalancing force in timed relation to the response of the process to the adjustment of said flow means and control mechanism.

8. A process regulator comprising a process control mechanism, drive means for said mechanism having a variable operating efficiency, means for regulating the efficiency of said drive means, a normally balanced metering device adapted to be unbalanced by a process variation, means for temporarily rebalancing said metering device, and means controlled by said metering device upon unbalance thereof for energizing and then deenergizing said regulating and rebalancing means simultaneously, said rebalancing means operating in proportional relation to the operation of said regulating means and maintaining rebalance of said metering device pending response thereof to actuation of said efficiency-regulating means.

9. A process regulator comprising a process control mechanism, drive means for said mechanism, means for adjusting said drive means including means for supplying and withdrawing a liquid, a normally balanced metering device responsive to a process variation, means for temporarily applying a rebalancing force to said metering device, a reversible switch selectively actuated by said metering device upon unbalance thereof, a reversible relay controlled by said switch, electrical means controlled by said relay for simultaneously and proportionally actuating said adjusting and rebalancing means and means for timing application of said rebalancing force with the time required for response of said metering device to changes in said process by said drive-adjusting means.

10. A process regulator comprising a process control mechanism including drive means having a variable operating efficiency, means for adjusting said drive means, a normally balanced metering device responsive to a process variation, means for temporarily applying a rebalancing force to said metering device, a reversible electric switch selectively actuated by said metering device upon unbalance thereof, and reversible electrical means simultaneously and proportionally controlling said adjusting means and rebalancing means and controlled by said switch, said temporary rebalancing force being effective on said metering device only pending response thereof to process changes initiated by said adjusting means.

11. A process regulator comprising a process control mechanism including an element having a variable operating efficiency, means for adjusting said variable element, a metering device responsive to a process variation and including a normally balanced diaphragm, means for temporarily applying to said metering device a diaphragm rebalancing force including a reversible positive displacement air pump, a reversible electric switch selectively actuated by said metering device upon unbalance of said diaphragm, and reversible electric means controlled by said switch and simultaneously and proportionally controlling said adjusting means and said pump and means for timing the effect of said air pump on said diaphragm according to the time required for response by said diaphragm to change in said process initiated by said adjusting means.

12. A process regulator comprising a process control mechanism, adjustable drive means for said mechanism, liquid flow means for adjusting said drive means, a normally balanced metering device, means for applying a rebalancing force to said metering device, a reversible electric switch selectively actuated by said metering device upon unbalance thereof, reversible electric means controlled by said switch and proportionally controlling said liquid flow means and said rebalancing means and means for dissipating said rebalancing force as said metering device reacts to process changes initiated by said liquid flow means.

13. A process regulator comprising a process controller, adjustable drive means therefor, means for adjusting said drive means including a reversible liquid pump, a metering device including a diaphragm responsive to a process variable, means for normally balancing said diaphragm, means for applying to said metering device a diaphragm rebalancing force for a time after each diaphragm movement proportional to the deviation of the process from its predetermined desired value, said last named means including a reversible air pump, reversible electrical means controlling said pumps, and a reversible switch controlling said electrical means and selectively actuated by said metering device upon unbalance of said diaphragm.

14. A process regulator comprising a continuously operating process control mechanism, means for adjusting said mechanism, said adjusting means being of a type lacking a mechanical reset reference point, a normally balanced metering device responsive to a process variation, means for applying a rebalancing force to said metering device, reversible electrical means controlling said adjusting means and said rebalancing means, means selectively actuated by said metering device upon unbalance thereof for energizing said electrical means, and means for dissipating said rebalancing force during the time required for response of said process and metering device to the adjustment of said control mechanism.

15. A process regulator comprising a continuously operating process control mechanism, means for adjusting said mechanism, said adjusting means being of a type lacking a mechanical reference reset point, a normally balanced metering device, reversible force generating means for applying a rebalancing force to said metering device, reversible electrical means for simultaneously energizing and deenergizing said adjusting means and said generating means in rebalancing relation, and means selectively actuated by said metering device upon unbalance thereof for energizing said electrical means and means for dissipating said metering rebalancing force in time with the response of said metering device to adjustment of said control mechanism.

16. A process regulator comprising a continuously operating process control mechanism, means for adjusting said mechanism, said adjusting means being of a type lacking a mechanical reference reset point, a normally balanced metering device connected with said process, reversible electrical means controlled by said metering device upon unbalance thereof for energizing said adjusting means in corrective relation, and means energized by said electrical means for directly applying a rebalancing force to said metering device for the time required for response to said metering device to variation of said process by said control mechanism.

17. A process regulator comprising a continuously operating process control mechanism, means for adjusting said mechanism, said adjusting means being of a type lacking a mechanical reference reset point, a normally balanced metering device, reversible electrical means controlled by said metering device upon unbalance thereof for energizing said adjusting means in corrective relation, means energized by said electrical means for temporarily and directly applying a rebalancing force to said metering device, and means for dissipating said rebalancing force in time with the response of said metering device to adjustment of said control mechanism.

18. A process regulator comprising a process control mechanism, means for adjusting said mechanism, a normally balanced metering device, a reversible electric switch selectively actuated by said metering device upon unbalance thereof, reversible electric means controlled by said switch and controlling said adjusting means, a reversible positive displacement air pump, means connecting said pump with said metering device, reversible electric means controlled by said switch and controlling said pump to apply a rebalancing force on said metering device, and adjustable bleed means interposed in said connecting means to dissipate said rebalancing force in the time required for response of said metering device to adjustment of said control mechanism.

19. A process regulator comprising a process control mechanism, means for adjusting said mechanism, a normally balanced metering device, a reversible electric switch selectively actuated by said metering device upon unbalance thereof, reversible electric means controlled by said switch and controlling said adjusting means, a reversible positive displacement air pump, means connecting said pump with said metering device, reversible electric means controlled by said switch and controlling said pump to apply a rebalancing force on said metering device, and adjustable bleed means interposed in said connecting means to dissipate said rebalancing force as said metering device responds to variation of said process by adjustment of said control mechanism, said pump including a pair of chambers each containing a liquid and communicating with a gear pump interposed therebetween, one of said chambers being open to atmosphere and the other communicating with said connecting means, and means for trapping air in said liquid.

20. A process regulator comprising a process control mechanism, means for adjusting said mechanism, a normally balanced metering device, a reversible electric switch selectively actuated by said metering device upon unbalance thereof, reversible electric means controlled by said switch and controlling said adjusting means, a pair of juxtaposed chambers each containing a liquid, a conduit connecting the upper end of one chamber with said metering device, the other chamber being open to atmosphere at its upper end, a pair of conduits connecting the lower ends of said chambers, one of said last named conduits extending below said chambers and the other terminating at its ends within said chambers and above the liquid levels of said chambers and having a small aperture at each end portion below said liquid level, a pump interposed in said apertured conduit, reversible electric means controlled by said switch and controlling said pump and means for dissipating impulses transmitted to said metering device through said first conduit in time with the time of response of said metering device to process variations produced by said control mechanism.

FRANK DONALD BURNS.

REFERENCES CITED

The following references are of record in the file of this patent:

UNITED STATES PATENTS

| Number | Name | Date |
|---|---|---|
| 2,193,184 | Weaver | Mar. 12, 1940 |
| 2,193,192 | Dueringer | Mar. 12, 1940 |
| 2,178,864 | Rosenberger | Nov. 7, 1939 |
| 2,208,559 | Baak | July 23, 1940 |
| 2,285,287 | Krogh | June 2, 1942 |
| 2,053,797 | King | Sept. 8, 1942 |
| 2,116,992 | Weaver | May 10, 1938 |
| 2,098,914 | Gorrie | Nov. 9, 1937 |
| 2,255,284 | Gorrie | Sept. 9, 1941 |
| 2,356,580 | Gorrie | Aug. 22, 1944 |